Figure 1:
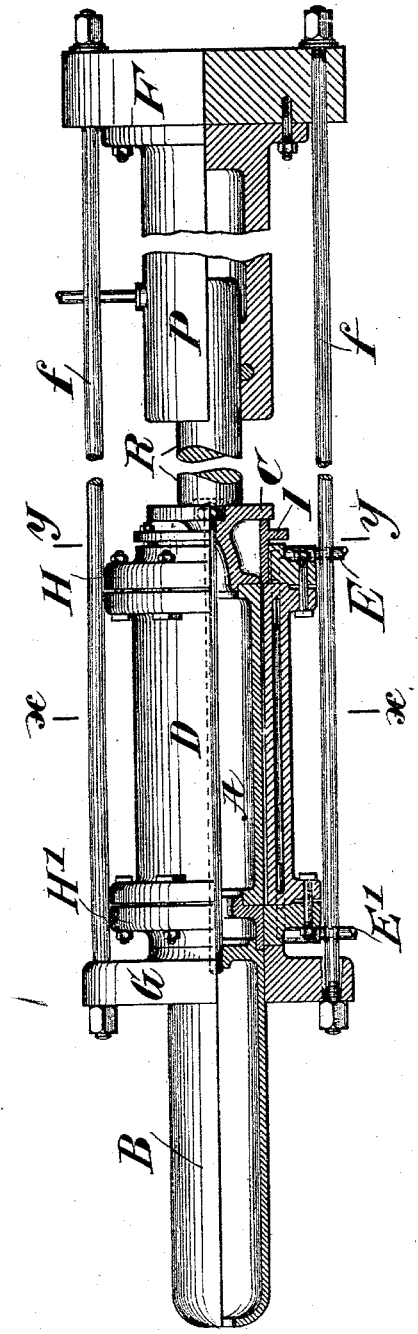

(No Model.) 2 Sheets—Sheet 1.
H. ZIEGLER-REINACHER.
APPARATUS FOR PRODUCING HOLLOW CELLULOID PRINTING CYLINDERS.
No. 556,796. Patented Mar. 24, 1896.

Witnesses:
B. S. Ober
Henry Orth Jr.

Inventor:
Heinrich Ziegler-Reinacher
by Henry Orth, atty.

(No Model.) 2 Sheets—Sheet 2.
H. ZIEGLER-REINACHER.
APPARATUS FOR PRODUCING HOLLOW CELLULOID PRINTING CYLINDERS.
No. 556,796. Patented Mar. 24, 1896.
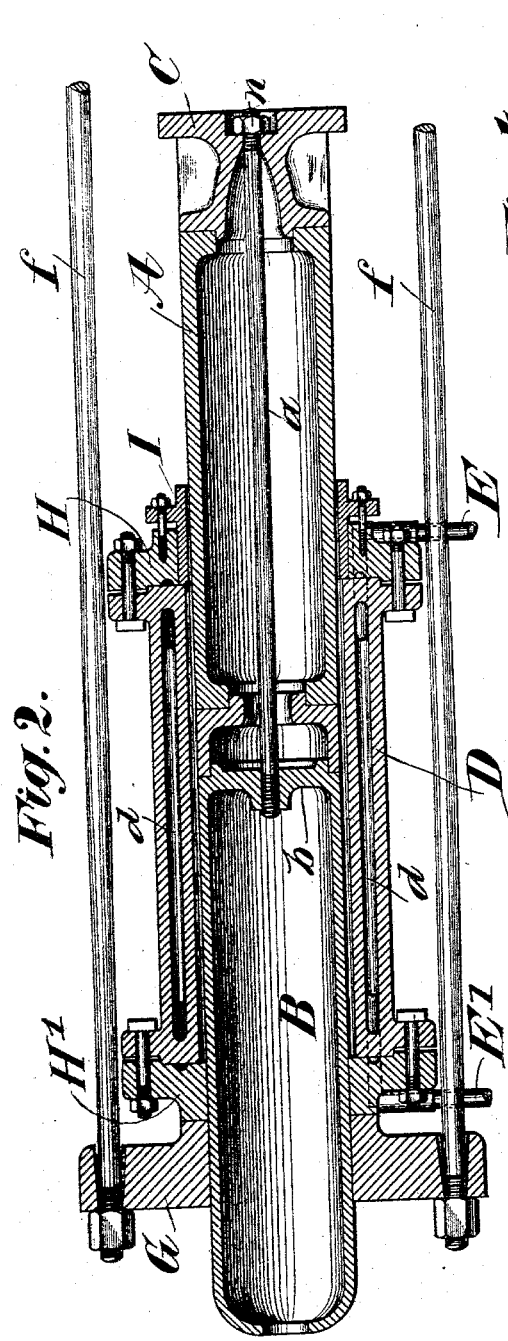
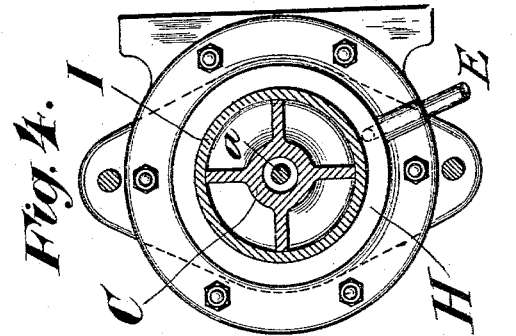
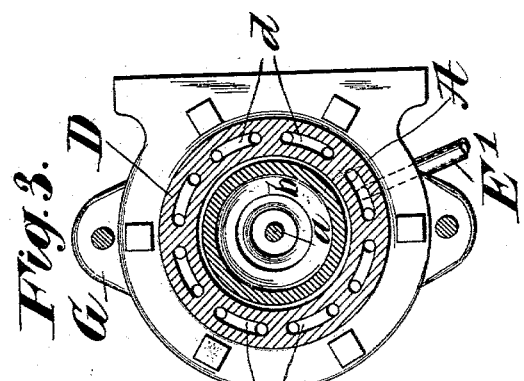
Witnesses:
Inventor:
Heinrich Ziegler-Reinacher.

UNITED STATES PATENT OFFICE.

HEINRICH ZIEGLER-REINACHER, OF AADORF, SWITZERLAND.

APPARATUS FOR PRODUCING HOLLOW CELLULOID PRINTING-CYLINDERS.

SPECIFICATION forming part of Letters Patent No. 556,796, dated March 24, 1896.

Application filed September 5, 1895. Serial No. 561,507. (No model.)

*To all whom it may concern:*

Be it known that I, HEINRICH ZIEGLER-REINACHER, a citizen of the Republic of Switzerland, and a resident of Aadorf, Switzerland, have invented certain new and useful Improvements in Apparatus for Producing Hollow Celluloid Cylinders with Surface-Printing Designs, of which the following is a specification.

My invention has relation to apparatus for the production or manufacture of hollow cylindrical printing-forms from materials adapted to be rendered more or less plastic and to be again hardened.

The apparatus forming the subject-matter of my said invention is more especially designed for the production of cylindrical hollow printing-forms (printing-cylinders) from such materials as can be softened and rendered more or less plastic by heat, particularly celluloid, and I will confine the description to the production of celluloid printing-cylinders having the subject-matter to be reproduced in relief or intaglio, though I do not confine the use of the apparatus exclusively to such production, as it is applicable also to the ornamentation of cylindrical or more or less conical forms.

In the accompanying drawings, Figure 1 is a half-elevation and half-longitudinal section of an apparatus embodying my invention. Fig. 2 is a longitudinal axial fragmentary section thereof. Figs. 3 and 4 are sections on lines $x\ x$ and $y\ y$ of Fig. 1, and Fig. 5 is a detail sectional view.

Similar symbols of reference are employed to indicate like parts wherever such may occur in the described figures of drawings.

The apparatus consists of a cylinder D, in the walls of which are formed interconnected chambers or passages $d$, whose inlet and outlet ports are in the opposite ends of the cylinder and communicate with inlet and outlet passages in the respective cylinder-heads H and H', said passages being connected by inlet and outlet pipes E and E', respectively. The inlet-pipe E is connected with a suitable source of steam and cold-water supply in such manner as that either steam or cold water may be caused to circulate through the walls of cylinder D for the purpose of heating or cooling the latter, and as such arrangements are well known I have deemed it unnecessary to illustrate the same. Inasmuch as the cylinder D is not subjected to great pressure, a thin walled cylinder can be used and provided with a heating-jacket, a construction that is also well known.

In the cylinder D works a hollow plunger constructed in two sections, A and B, the latter serving as a guide extension for the former, said sections being detachably connected through the medium of an intermediate thimble $b$, a head C for the plunger-section A, and a connecting-rod $a$. As shown, the plunger-section A is of slightly-increased diameter from its point of contact with the thimble $b$ to its head C, so that a cylinder of celluloid drawn onto such plunger will firmly adhere thereto. The interior diameter of the cylinder D relatively to the greatest exterior diameter of the plunger A is such as not only to accommodate the latter and the celluloid jacket thereon, but also to accommodate a matrix I°, Fig. 5, of sheet metal.

Any suitable means may be provided for imparting endwise motion to the plunger A B into and out of cylinder D. In the drawings, Fig. 1, I have shown a hydraulic ram, the cylinder P of which is secured to one of the machine-heads F, while the ram R is adapted to impinge upon the head C of the plunger A B and push the same into cylinder D, the movement of the plunger out of said cylinder being effected by hand, as this requires no great power; but it may also be effected through the medium of the ram by connecting the same to the head C and constructing the ram in the form of a piston, in which case the cylinder D will be provided with admission and exhaust ports at each end, or an ordinary steam-cylinder and piston may be used, these modifications being within the province of any skilled mechanic.

The machine-head F is connected by means of rods $f$ with a second machine-head, G, to which the cylinder-head H' is secured, said heads F and G being constructed with bases and performing the function of supports for the machine.

The bores of the machine-head G and cylinder-head H are of such diameter as to practically form a fluid-tight joint with the guide extension B of the plunger A B, and as the interior diameter of the cylinder D is greater than the diameter of said bores an annular shoulder is formed, against which the celluloid when rendered plastic is crowded to fill the space between the plunger and the matrix I°, the clamping-sleeve I performing the same function at the opposite end of the cylinder D. This clamping-sleeve serves to clamp the matrix I° to the cylinder D, said matrix being provided with an annular flange $i'$ overlapping the cylinder end, and said sleeve being detachably connected by bolts and nuts $i$ to said cylinder D, as clearly shown in Fig. 5.

The mode of transferring subject-matter to be printed from a matrix to a cylindrical celluloid printing-form is as follows: The plunger A B being pushed out of cylinder D, a sheet-metal cylindrical matrix I°, having the subject-matter to be transferred to a celluloid cylinder in relief or intaglio on the inner periphery, is inserted into said cylinder D and clamped thereto by means of the sleeve I. The plunger A B, with its celluloid jacket, is then pushed into the cylinder as far as this can be done, in view of the gradually-increasing diameter of plunger-section A, and steam is turned on to heat the cylinder D and soften the celluloid, when the ram R is set in operation to force the plunger fully home, thereby bringing the more or less plastic celluloid into intimate contact with the matrix and transferring the subject-matter thereon to the celluloid. The supply of steam is now cut off and cold water or another cooling agent supplied to the cylinder D, whereby the latter and the celluloid jacket or cylinder on the plunger-section A are cooled, thereby hardening the more or less plastic celluloid. The clamping-sleeve I is now removed and the plunger A B pushed out of cylinder D, carrying with it the matrix I°, after which the mandrel is stripped of its celluloid cylinder and the matrix I° removed therefrom, the whole operation being completed in about half an hour.

The operation of stripping the plunger may be facilitated by disconnecting the guide extension B therefrom, which can readily be done by removing the nut $n$ at the outer end of rod $a$, Fig. 2.

Having thus described my invention, what I claim as new therein, and desire to secure by Letters Patent, is—

1. In an apparatus such as described, the combination with a cylinder and a matrix fitting the bore thereof, of a plunger of less diameter than the interior diameter of said matrix, said plunger adapted to carry a cylinder of celluloid, means for driving said plunger with its cylinder of celluloid into the matrix and means for reducing said cylinder of celluloid to a more or less plastic state as it is driven into the matrix, for the purpose set forth.

2. In an apparatus such as described, the combination with a cylinder and a matrix fitting its bore, of a cylindro-conical plunger whose greatest diameter is less than the interior diameter of such matrix, said plunger adapted to carry a cylinder of celluloid, means for driving the plunger and its cylinder of celluloid into the matrix, and means for reducing said cylinder of celluloid to a more or less plastic state as it is driven into such matrix, for the purpose set forth.

3. In an apparatus such as described, the combination with an open-ended cylinder, and a like matrix fitting its bore; of a plunger of less diameter than the interior diameter of the matrix and adapted to support a cylinder of celluloid, means for driving said plunger and its cylinder of celluloid into said matrix, means for reducing said cylinder of celluloid to a more or less plastic state as it is driven into the matrix, and means for preventing the plastic material from escaping from the open ends of such matrix, for the purpose set forth.

4. In an apparatus such as described, the combination with an open-ended cylinder, a like matrix fitting its bore, and means for reducing the interior diameter of said matrix at opposite ends; of a plunger of cylindrical form for a portion of its length and of a cylindro-conical form for the remaining portion of the length, said cylindrical portion fitting the reduced interior diameter of one end of the matrix, the greatest diameter of the cylindro-conical portion fitting the reduced interior diameter at the opposite end of said matrix, said cylindro-conical portion of the plunger of a length greater than that of said matrix and adapted to support a cylinder of celluloid, means for driving the plunger and its cylinder of celluloid into said matrix and means for reducing the cylinder of celluloid to a more or less plastic state as it is driven into such matrix, for the purpose set forth.

5. In an apparatus such as described, the combination with an open-ended cylinder, a like matrix fitting its bore, and means for reducing the interior diameter of said matrix at opposite ends; of a plunger composed of two detachably-connected parts, one of said parts of a diameter equal to the reduced interior diameter of one end of the matrix, the other part of cylindro-conical form, the greatest diameter of which is equal to the reduced interior diameter of said matrix at its opposite end, the last-named part of the plunger of a greater length than the matrix and adapted to support a cylinder of celluloid, means for driving the plunger with its cylinder of celluloid into the matrix and means for reducing the cylinder of celluloid to a more or less plastic state as it is driven into such matrix, for the purpose set forth.

6. In an apparatus such as described, the combination with an open-ended cylinder and a like matrix fitting its bore; of a cylindro-conical plunger whose greatest diameter is less than the interior diameter of said matrix and is adapted to carry a cylinder of celluloid, means for driving the plunger with its cylinder of celluloid into the matrix, appliances for reducing the cylinder of celluloid to a more or less plastic state as it is driven into said matrix, and means for preventing the escape of the celluloid at the open ends of such matrix, for the purpose set forth.

7. In an apparatus such as described, the combination with an open-ended cylinder, a like matrix fitting its bore and means for reducing the interior diameter of the matrix at its opposite ends; of a hollow plunger composed of a cylindrical and a cylindro-conical section and flanged head detachably connected together, said cylindrical section fitting the reduced diameter of the matrix at one end and said flanged head fitting the like diameter of said matrix at its opposite end, the cylindro-conical section of the plunger adapted to carry a cylinder of celluloid, means for driving the plunger and its cylinder of celluloid into the matrix, and appliances for reducing said cylinder of celluloid to a more or less plastic state as it is driven into said matrix, for the purpose set forth.

8. In an apparatus such as described, the combination with an open-ended cylinder, a like matrix fitting its bore, and means for reducing the interior diameter of the matrix at its opposite ends, of a hollow plunger composed of a cylindrical and a cylindro-conical section, an intermediate thimble, and flanged head detachably connected together by means of an interior connecting-rod, said cylindrical section fitting the reduced diameter of the matrix at one end and said flanged head fitting the like diameter of such matrix at its opposite end, the cylindro-conical section of the plunger adapted to carry a cylinder of celluloid, means for driving the plunger and its cylinder of celluloid into the matrix, and appliances for reducing said cylinder of celluloid to a more or less plastic state as it is driven into said matrix, for the purpose set forth.

In testimony whereof I hereunto sign my name, in the presence of two subscribing witnesses, this 26th day of July, 1895.

HEINRICH ZIEGLER-REINACHER.

Witnesses:
EMIL BLUM,
H. A. ALEHART.